United States Patent [19]

Chardon et al.

[11] 4,438,606
[45] Mar. 27, 1984

[54] SHELTER FOR PROTECTING LARGE-SIZE OBJECTS

[76] Inventors: Andre-Marie Chardon, Aux amphores, Courcelles, 89570 Neuvy-Sautour; Philippe Guibert, 2 Place des Magnolias, 77680 Roissy en Brie, both of France

[21] Appl. No.: 289,054

[22] Filed: Jul. 31, 1981

[30] Foreign Application Priority Data

Apr. 1, 1981 [EP] European Pat. Off. .................... NR 81400523.7

[51] Int. Cl.³ ................................................ E04L 1/12
[52] U.S. Cl. ..................................... 52/79.1; 52/264; 52/DIG. 14; 220/69; 109/50; 109/51; 248/DIG. 10
[58] Field of Search ............... 52/103, 143, 168, 236.1, 52/79.1, 79.4, 264, 265, 23, 71, DIG. 14; 109/50, 51, 52; 220/68, 69; 248/DIG. 10

[56] References Cited

U.S. PATENT DOCUMENTS

| 9,305 | 7/1880 | Heineman | 109/50 |
|---|---|---|---|
| 970,873 | 9/1910 | Bear | 52/23 |
| 1,479,557 | 1/1924 | Raymond | 52/23 |
| 2,405,116 | 8/1946 | Cullen | 52/336 |
| 2,525,091 | 10/1950 | Brownawell | 52/103 |
| 2,635,563 | 4/1953 | McBride | 109/52 |
| 3,442,057 | 5/1969 | Derr | 52/143 |
| 3,471,114 | 10/1969 | Ball | 248/DIG. 10 |
| 3,830,024 | 8/1974 | Warnke | 52/23 |
| 4,077,593 | 3/1978 | Carratala | 312/351 |
| 4,258,632 | 3/1981 | Lapoint | 109/52 |

FOREIGN PATENT DOCUMENTS

| 176310 | 6/1935 | Switzerland | 52/264 |
|---|---|---|---|
| 238101 | 10/1945 | Switzerland | 52/DIG. 14 |

*Primary Examiner*—Henry E. Raduazo
*Attorney, Agent, or Firm*—McAulay, Fields, Fisher, Goldstein & Nissen

[57] ABSTRACT

A shelter for protecting large-size objects, such as open-air machines, cycles, motorcycles, windsurfers, etc. . . . comprises, on its front face, a door giving access to the interior of the shelter and, in its lower part, a flooring on which the object or objects to be protected with beneath the flooring, a compartment in which is housed a heave mass of which the weight is transferred onto the walls of the shelter, in order considerably to increase the total weight of the shelter and prevent easy handling thereof.

11 Claims, 6 Drawing Figures

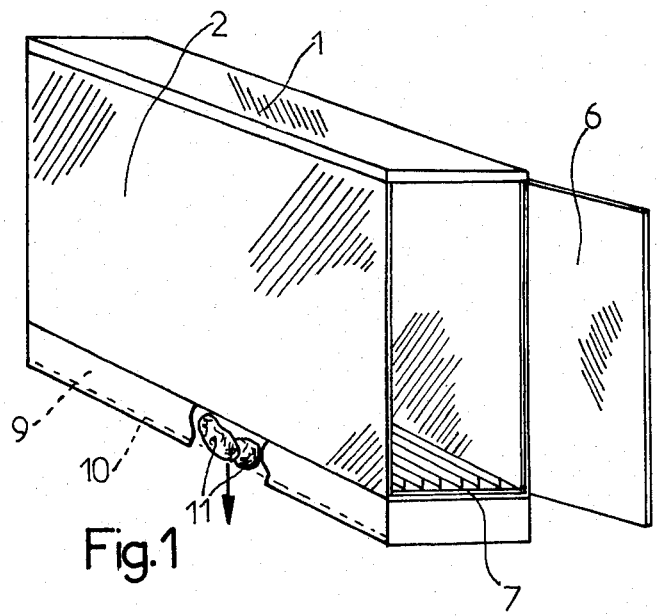
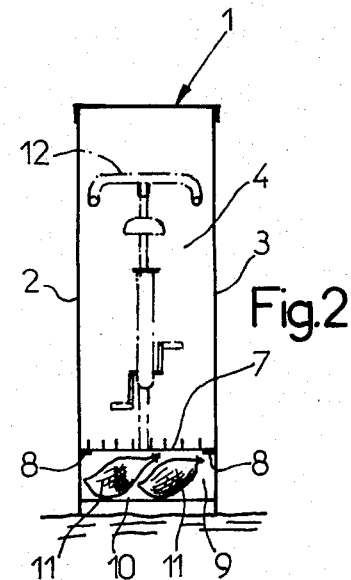
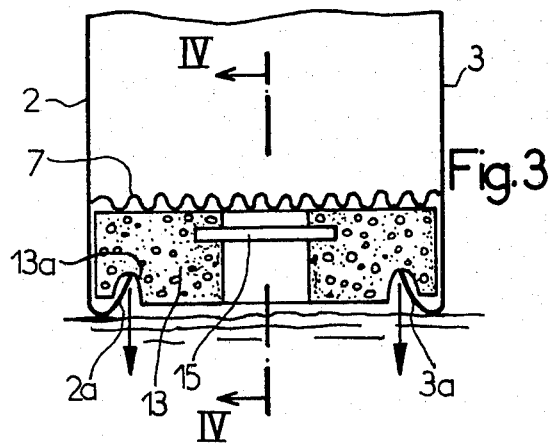
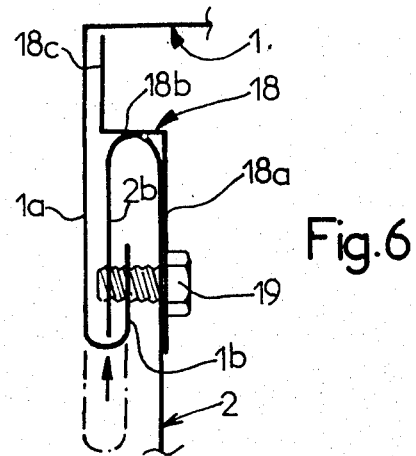
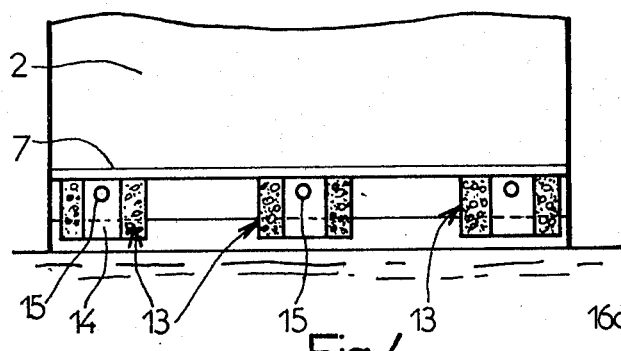
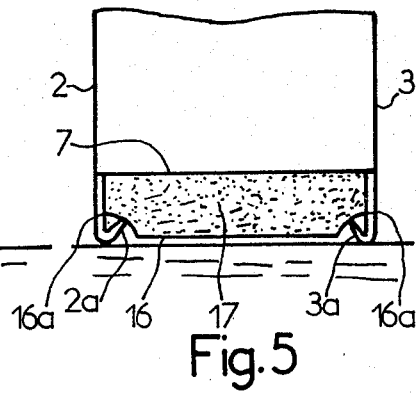

SHELTER FOR PROTECTING LARGE-SIZE OBJECTS

BACKGROUND OF THE INVENTION

The present invention relates to a shelter for protecting large-size objects, and more particularly open air machines such as cycles, motorcycles, wind surfers, boat accessories, etc.

Cycles and motorcycles can be protected from theft by means of various devices employing a cable, chain, steering lock, . . . but these devices do not, in fact, prevent theft if the thief has suitable tools, nor partial deterioration of the machine.

To overcome this drawback, it has already been envisaged to make a protective shelter constituting to some extent a garage in which the cycles and motorcycles may be stowed. Such a container is described in French Pat. No. 77 21031. This container comprises a box whose front face is closed by one or more folding doors, allowing access to the inside thereof and enabling the machines which are to be protected from theft and bad weather, to be housed therein. Closure is ensured by means of a lock which is preferably unpickable.

However, a container of this type does not prevent theft of whole of the shelter, together with the machine that it contains, which may easily be transported at night, in view of its low weight. The shelter may of course be firmly fixed to the ground by anchoring members, but in this case it would not be readily movable.

It is an object of the present invention to remedy these drawbacks by providing a protecting shelter of particularly simple design, which may be easily moved for use at different spots and which cannot be displaced, once placed in position, without resorting to special handling apparatus.

SUMMARY OF THE INVENTION

The shelter of this invention for protecting large-size objects, such as open-air machines, cycles, motorcycles, windsurfers, etc. comprising, on its front face, a door giving access to the interior of the shelter and, in its lower part, a flooring on which the object or objects to be protected rest, is characterised in that the shelter further comprises, beneath the flooring, a compartment in which is housed a heavy mass whose weight is transferred onto the walls, in order considerably to increase the total weight of the shelter and prevent easy handling thereof.

The protecting shelter according to the invention may have any desired shaped adapted to the shape of the objects which it is to contain. In particular, it may be parallelepipedic, this shape being particularly suitable for accomodating cycles and motorcycles or even windsurfers. It may be made of any suitable material: reinforced or non-reinforced plastics material, metal, wood, etc.

The ballast housed in the lower compartment may be constituted by discontinuous elements such as blocks, plates, bags filled with heavy material or, according to a variant, it may be formed by a continuous mass of material available at the location of the shelter, such as earth, sand, gravel. The ballast is positioned in the lower compartment of the shelter once the latter has been mounted on the ground, in the bottom of the shelter before the lower flooring and upper cover have been placed in position.

The shelter according to the invention is advantageously made in kit form, the constituent elements being assembled in situ.

BRIEF DESCRIPTION OF THE DRAWINGS

The invention will be more readily understood on reading the following description with reference to the accompanying drawings, in which:

FIG. 1 is a perspective view of a protecting shelter according to the invention.

FIG. 2 is a view in vertical, transverse section of the shelter of FIG. 1.

FIG. 3 is a view in vertical, transverse section of a variant embodiment of the lower part of the shelter.

FIG. 4 is a view in vertical, longitudinal section along line IV–IV of FIG. 3.

FIG. 5 is a view in vertical, transverse section of a variant embodiment of the lower part of the shelter.

FIG. 6 is a partial view in vertical section of a device for fixing the cover of the shelter.

DESCRIPTION OF THE PREFERRED EMBODIMENTS

Referring now to the drawings, the protecting shelter shown in FIGS. 1 and 2 is generally in parallelepipedic form and comprises an upper cover 1, two vertical walls 2 and 3, a rear wall 4 and a front face on which is pivotally mounted a door 6 for closing the shelter.

Inside, the shelter comprises a flooring 7, preferably constituted by sheet metal, which is maintained at a certain distance above the ground. This sheet metal 7 may simply be placed on lateral supports 8 fast with the longitudinal walls 2 and 3 (FIG. 2). Below the flooring 7 there is provided a lower compartment 9 in which is housed a heavy mass forming ballast. This heavy mass rests on a horizontal bottom 10 fast with the two longitudinal, vertical walls 2 and 3. In the example shown in FIGS. 1 and 2, the ballast is constituted by bags 11 containing a heavy material, for example sand or earth.

Once the shelter has been mounted, and before the cover 1 is finally placed in position, the ballast 11 is charged in the lower compartment 9 by laying it on the lower bottom 10, then the flooring 7 is positioned thereabove. This flooring may be flat or corrugated so as to form parallel grooves facilitating introduction of the objects in the shelter. This arrangement is particularly advantageous when the shelter is intended to contain a bicycle 12, as shown schematically in FIG. 2, this bicycle being thus guided by the corrugations or grooves of the flooring 7.

In the embodiment illustrated in FIGS. 3 and 4, the ballast is constituted by blocks of cast concrete 13 which are spaced apart from one another in the longitudinal direction. Each of these blocks 13 is substantially parallelepipedic in shape and has in its central part a through hole 14. A bar 15 extends across the top part of this hole 14, its ends being set in the concrete. This bar is intended to facilitate handling of the blocks 13.

The lower part of each block 13 abuts on the upper edges of two flanges 2a, 3a which are an integral part of the vertical, longitudinal walls 2, 3 and which are curved inwardly and upwardly. The lower face of each block 13 preferably presents two grooves 13a which cover the corresponding flanges 2a and 3a, as may be seen in FIG. 3.

In the example illustrated in FIG. 4, the whole of the ballast is constituted by three blocks 13 spaced apart from one another, namely one block at each and a block at the centre. The flooring 7 which is constituted by a flat or preferably corrugated sheet metal, thus rests on the blocks 13 and is supported thereby.

FIG. 3 shows that the weight of the various blocks 13 is transferred on the upper edges of the flanges 2a and 3a, which tends, on the one hand, to apply the whole of the shelter firmly on the ground and, on the other hand, to cause the vertical, longitudinal walls 2 and 3 to pivot towards each other, thus contributing to increasing the rigidity of the assembly.

In the embodiment illustrated in FIG. 5, the blocks 13 are replaced by a metal tank 16 whose bottom is provided in the vicinity of its longitudinal sides, with two longitudinal grooves 16a covering the flanges 2a, 3a of the two walls 2 and 3. The ballast is constituted by a heavy mass 17 which fills the tank 16. This mass may be formed by sand, earth, gravel, etc. The tank 16 is filled so that the heavy mass is level with its top edge and thus serves as support for the flooring 7.

In all the embodiments of the invention which have just been described, the ballast is placed in the lower compartment 9 before the flooring 7 and finally the cover 1 are placed thereabove. The cover may be assembled on the vertical walls in various manners. FIG. 6 illustrates a particularly advantageous mode of assembly. In this case, the upper part of the wall 2 presents a flange 2b which is bent outwardly and downwardly. Furthermore, the cover 1 comprises along its longitudinal edges a flange 1a bent downwardly at right angles and extended at its end by another flange 1b of shorter length and which is curved inwardly and upwardly. The assembly furthermore comprises a Z-shaped element 18 which comprises a lower flange 18a extending downwardly, against the inner surface of the upper part of the vertical wall 2, a horizontal intermediate flange 18b in abutment on the upper rounded edge formed between the wall 2 and the outer flange 2b extending downwardly, and an upper flange 18c extending upwardly at right angles from the intermediate flange 18b and offset outwardly. These various elements are connected by means of a self-tapping screw 19 whose threaded shank passes successively through the holes pierced in the flange 18a, wall 2, flange 1b, flange 2b, from the inside to the outside.

The cover is positioned as follows: the cover 1 is firstly applied in low position on the upper rounded edge of the wall 2, the Z-shaped element 18 not being positioned. In this position, the flange 1b is completely located below the lower edge of the flange 2b so that it is placed beneath the inverted U formed by the flange 2b and the top part of the wall 2. The Z-shaped element 18 is then placed in position, by penetrating inside the shelter. This lifts the cover 1, after which the screw 19 is engaged as illustrated in FIG. 6, which ensures assembly of the various elements and maintaining of the cover 1 in elevated position. This device virtually renders the cover 1 burglarproof as dismantling can only be effected once the shelter is open, since it is only in this case that the head of the screw 19 is accessible.

What is claimed is:

1. A shelter for protecting large size objects, comprising:
    a structure having a shape adapted to the shape of the objects it is to contain and formed of two spaced vertical, longitudinal walls, and a rear wall connecting said vertical, longitudinal walls;
    a cover fitting over said walls;
    a front face, a door pivoted on said face for closing said shelter;
    a flat flooring defining with said walls a lower compartment, said flooring being constituted by a removable sheet metal; and
    in said compartment, a heavy mass whose weight bears onto the walls of the shelter in order considerably to increase the total weight of the shelter and prevent easy handling thereof.

2. The shelter of claim 1, having lateral supports fast with said longitudinal, vertical walls.

3. The shelter of claim 1, wherein said sheet metal constituting the flooring rests simply on said heavy mass housed in said lower compartment.

4. The shelter of claim 1, wherein said flooring is provided over its upper face with longitudinal grooves.

5. The shelter of claim 1, wherein said heavy mass is constituted by bags containing a heavy material.

6. The shelter of claim 1, wherein said mass consists of a tank filled with heavy contents, and abutting by its lower face on the upper edges of said flanges, of said two longitudinal, vertical walls.

7. A shelter for protecting large size objects, comprising:
    a structure having a shape adapted to the shape of the objects it is to contain and formed of two spaced vertical, longitudinal walls, and a rear wall connecting said vertical, longitudinal walls; a cover fitting over said walls;
    a front face, a door pivoted on said face for closing said shelter;
    a flat flooring defining with said walls a lower compartment; and
    in said compartment, a heavy mass whose weight bears onto the walls of the shelter in order considerably to increase the total weight of the shelter and prevent easy handling thereof; and said vertical horizontal walls have at their lower end, flanges curved inwardly and upwardly and said mass consists of a plurality of blocks, said blocks having grooves resting on said flanges.

8. The shelter of claim 7, wherein each block is pierced with a through hole and a bar for handling purposes extends across the upper part of said hole, and is set in said block.

9. The shelter of claim 7, wherein the lower face of each block is provided with two grooves which cover said corresponding flanges of the vertical, longitudinal walls.

10. The shelter of claim 7, wherein said mass consists of a tank filled with heavy contents, and abutting by its lower face on the upper edges of said flanges, of said two longitudinal, vertical walls.

11. The shelter of claim 7, wherein the top part of each of said vertical, longitudinal walls is provided with a flange bent downwardly and outwardly; said cover comprising, along its longitudinal edges, a flange bent downwardly at right angles and extended at its end by another flange of shorter length curved inwardly and upwardly, with means for assembling said cover and said vertical walls which comprises a Z-shaped element having a lower flange extending downwardly, against the inner surface of the upper part of the vertical wall, a horitzontal intermediate flange in abutment on the upper rounded edge formed between the vertical wall and the outer flange extending downwardly, and an upper flange extending upwardly at right angles from the intermediate flange and offset outwardly, together with means for connecting said elements including a selftapping screw having a threaded shank passing successively through holes made in said lower flange of said Z-shaped element, one of said vertical walls, said lower upwardly extending flange of said cover and said downwardly curved flange of said vertical wall, from the inside towards the outside.

* * * * *